3,677,813
PROCESS FOR DRESSING LEATHER AND THE DRESSED LEATHER
Guenter Eckert, Limburgerhof, Matthias Marx, Bad Duerkheim, Heinrich Hartmann, Limburgerhof, and Lothar Wuertele, Ludwigshafen, Germany, assignors to Badische Anilin- & Soda-Fabrik Aktiengesellschaft, Ludwigshafen (Rhine), Germany
No Drawing. Filed Dec. 17, 1969, Ser. No. 886,043
Int. Cl. B44d 1/32; C14c 9/00
U.S. Cl. 117—142                                      12 Claims

ABSTRACT OF THE DISCLOSURE

Process for dressing leather and synthetic leather substitutes by applying to the leather a composition comprising (a) a copolymer carrying acetyl acetate groups or cyano acetate groups, in the form of a solution or dispersion in an organic liquid, and (b) one or more aldehydes or a compound capable of dissociating to give an aldehyde, and drying the coating. The resulting dressing is waterproof and resitsant to solvents.

---

This invention relates to a process for dressing leather or synthetic leather substitutes so as to provide special protection particularly against moisture and aging. Dressings of this kind are now generally referred to as "easy-care" dressings.

The aim of any leather dressing, also known as leather finish, is to impart a certain appearance and certain fastness properties to the leather. Thus the dressing influences the shade, gloss, levelness and resistance of the leather to external mechanical and optical influences during the manufacture and use of the leather article.

It is known that leather may be coated with natural substances which have been modified and varied by chemical treatment. Thus, for example dressings containing alkaline casein solutions may be made water-insoluble by appropriate treatment with acids and formaldehyde, but such dressings still remain swellable in water and thus susceptible to moisture.

Finishing agents containing nitrocellulose nearly always incorporate plasticizers. Thus dressings effected with such finishing agents are always subject to the risk of the plasticizer migrating into the primer or into the leather making the dressing brittle and cracked, so that in many cases the coating of finishing agent may even scale off. Processing is further hampered by the fact that nitrocellulose is highly flammable. This drawback continues to exist even after processing, which is why leather substitutes, for example, which have been dressed with finishing agents containing nitrocellulose are not used for covering seats in aircraft. It is known to use nitrocellulose in the form of aqueous secondary emulsions and thus reduce flammability at least during the dressing operation, but dressings prepared with such emulsions are, due to the hydrophilic auxiliaries contained therein, less moisture-resistant than dressings based on nitrocellulose in organic solvents.

Polymer dispersions have virtually no value as finishing agents for leather, since they do not have adequate abrasion resistance and scratch resistance when sufficiently elastic for use as final finishes. Moreover, the thermoplastic behavior of the polymers limits the range of their application.

We have now found that excellent easy-care leather or synthetic leather substitutes may be obtained by using for dressing a composition consisting of or containing (I) a solution in an organic solvent or a dispersion of a copolymer carrying acetyl acetate groups or cyano acetate groups, and (II) an aldehyde or mixture of different aldehydes and/or compounds capable of dissociating to give an aldehyde, as cross-linking agent.

The copolymers carrying acetyl acetate groups and/or cyano acetae groups may be obtained by copolymerizing copolymerizable ethylenically unsaturated compounds carrying acetyl acetate groups or cyano acetate groups with other copolymerizable compounds or, alternatively, by the trans-esterification of copolymers containing hydroxyl groups with low molecular weight esters of acetoacetic acid and/or cyanoacetic acid or, alternatively, by reaction with diketene.

In the process of the invention there are preferably used solutions or dispersions of copolymers (I) composed of (a) 0.5 to 90% by weight (based on the total weight of monomer) of copolymerizable ethylenically unsaturated compounds carrying acetyl acetate groups and/or cyano acetate groups, and (b) 99.5 to 10% by weight of other copolymerizable ethylenically unsaturated compounds.

Particularly suitable copolymers (I) are those composed of 10% to 90% by weight of (a) and 90% to 10% by weight of (b).

Suitable monomers (a) for the production of the copolymers (I) are, for example, mixed esters of the formula:

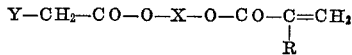

where X stands for an alkylene or oxalkylene radical each with 2 to 10 carbon atoms, R stands for hydrogen or a methyl group and Y stands for an acetyl or cyano group, based on dioles such as ethylene glycol, propane diol-1,2, butane diol-1,4, hexane diol - 1,6 and ethylene diglycol. Mixtures of different compounds defined by the above general formula are also suitable. These compounds may be simply prepared by first reacting the appropriate diol or the corresponding epoxide with acrylic acid or methacrylic acid to form a half-ester and then converting the free hydroxyl group therein to the ester group by reaction with suitable derivatives of acetoacetic acid and/or cyanoacetic acid, for example the appropriate anhydrides or esters. To obtain the mixed esters of the diols the free hydroxyl group in the half-ester of a polymerizable acid may be conveniently converted with diketene to the acetoacetyl group. Processes of this kind are known in principle.

Other suitable monomers (a) are the acetyl acetates and cyano acetates of vinyl thioalcohols, such as vinyl thioglycol acetyl acetate. The compounds may be obtained by reacting mercapto ethanols with acetylene and then reacting the resulting vinyl thioethanol with, for example, diketene, or alternatively by reacting with cyanoacetic alkyl esters, acetoacetic alkyl esters or the anhydrides of said acids.

Suitable other copolymerizable ethylenically unsaturated compounds (b) for the production of the copolymers (I) are acrylic and/or methacrylic acids, their alkyl esters containing 1 to 20, preferably 1 to 8 carbon atoms in the alkyl group, such as methyl methacrylate and ethyl, n-propyl, isopropyl, n-butyl, isobutyl, t-butyl and 2-ethylhexyl acrylates. Further suitable other monomers (b) are the vinyl esters of acetic acid, propionic acid and versatic acids, the N-hydroxymethylamides of methacrylic and/or acrylic acids and their ethers containing 1 to 8 carbon atoms in the alkyl radical, such as N-hydroxymethyl acrylamide, the n-butyl ether of N-hydroxymethyl acrylamide or N-hydroxymethyl methacrylamide; hydroxy alkyl esters of acrylic and/or methacrylic acids, acrylonitrile, methacrylonitrile, allyl alcohol, methallyl alcohol, vinyl chloride and vinylidene chloride, and butadiene. Mixtures of different monomers (a) and/or different monomers (b) are also suitable for the production of copolymers (I).

The copolymers (I) are obtained by conventional methods involving solution polymerization in organic liquids or dispersions polymerization in water or organic liquids. The usual radical polymerization catalysts, such as organic peroxides, redox catalyst systems or aliphatic azo compounds may be used. Suitable organic liquids which may be used as solvents or diluents are all organic solvents which are inert under the conditions of the radical polymerization reaction. The dispersion polymerization may also be carried out in water.

The copolymers (I) containing acetyl acetate groups and cyanoacetate groups may alternatively be obtained from copolymers containing hydroxyl groups in a reaction involving reaction with low molecular weight cyanoacetates and/or acetyl acetates or reaction with diketene.

The dressing agents used in the process of the invention contain, in addition to the copolymers (I), crosslinking agents (II) comprising an aldehyde or a mixture of different aldehydes, such as formaldehyde, acetaldehyde, propionaldehyde, glyoxal, acrolein, methacrolein and/or compounds capable of providing aldehydes, such as dimethylol urea or hexamethylene tetramine.

Since the reaction of the copolymers (I) with aldehydes is very rapid, particularly under weakly alkaline conditions, the two reaction components (I) and (II) will be conveniently kept in separate containers before use and not brought together until immediately before application to the substrate, for example by means of a two-component spray gun or a two-component spreading machine. The components (I) and (II) will be conveniently mixed in such proportions that the molar ratio of acetyl acetate groups and/or cyano acetate groups to aldehyde groups in the finishing composition is about 5:1 to 2:1. It is not generally advisable to go substantially below the molar ratio of 5:1 in the sense of reducing the proportion of aldehyde beyond that ratio, as then the cross-linking reaction slows down and at the same time the hardness and solvent resistance of the finish are diminished. The dressing agents themselves may be prepared in the usual manner in the form of solutions or dispersions in organic liquids or as aqueous dispersions of a consistency usual in leather dressing. Suitable organic liquids which may be used as solvents or dispersion media are aromatic hydrocarbons can be toluene and xylene, hydrocarbons with a boiling point of 80° to 160° C., esters such as ethyl and butyl acetates, ether esters such as methylglycol acetate, ketones such as acetone, methylethyl ketone and diethyl ketone, and alcohols such as ethanol, isopropanol, n-propanol, n-butanol, and monoethers of diols, for example glycol monomethyl ether or glycol monoethyl ether. In particular, solvent mixtures are suitable.

To the solutions or dispersions comprising the dressing agents there may be added any of the auxiliaries and additives normally used in leather dressings, such as plasticizers, pigments, flow improvers, and further binding agents such as phenolic resins, amino resins, alkyd resins, epoxide resins, cellulose derivatives and/or acrylate resins.

The dressing agents may be applied by any of the methods normally used in the dressing of leather, but we have found it particularly convenient to apply the two components (I) and (II) by means of a two-component spray gun or two-component casting machine on account of the rapid reaction rate involved.

Excellent adhesion is achieved with the dressing agents of the invention not only on leather but also on leather substitutes such as synthetic shoe upper leather substitutes and on other synthetic materials.

After application of the finish the resulting coating quickly becomes insoluble in water and organic solvents. This process may be accelerated by catalysts and/or heating. Particularly suitable catalysts are basic materials such as pyridine, trimethylamine, triethylamine, dialkylethanolamine containing 1 to 8 carbon atoms in the alkyl radical and/or sodium methylate. If it is desired to cure the coating by heating, the temperature at the surface of the leather should preferably not exceed 80° C. The cross-linking responsible for the curing effect may also be effected under acid conditions, but it usually proceeds more slowly under such conditions than under alkaline conditions.

Finishes prepared using a composition of components (I) and (II) exhibit adhesion on leather or synthetic leather substitutes of from 2,000 to 3,000 g./cm.$^2$. The resulting finishes are virtually unswellable in water and most organic solvents. The finishes also exhibit excellent flexibility and may be varied in hardness and elasticity within wide limits. The composition of the copolymers may be adjusted so that the abrasion resistance of the finish in dry and wet states is at least equal to that of the best dressings obtainable at the present time. The leather or leather substitute dressed in accordance with the present invention may usually be successfully subjected to further treatment by techniques usually employed in leather finishing for example ironing.

EXAMPLE 1

100 parts of a copolymer comprising 50 parts of methyl methacrylate, 45 parts of butanediolacrylateacetylacetate and 5 parts of acrylic acid is dissolved in 300 parts of isobutyl acetate.

A solution of 4 parts of formaldehyde in 20 parts of n-butanol is separately prepared.

The two solutions are placed in the separate chambers of a two-component spray apparatus and then sprayed onto non-pretreated natural leather. The coating obtained is immediately insoluble in organic solvents, water and aqueous liquors. The adhesion is 3,000 g./cm.$^2$. The coating does not swell in water. When tested in a flexometer no change, such as scaling, tearing or creasing of the coating, is observed after 50,000 flexures. Cold rupturing begins below 0° C. Dry and wet abrasion resistance is excellent, the coating remaining unchanged after 5,000 revolutions on a Satra apparatus.

EXAMPLE 2

100 parts of a copolymer comprising 50 parts of methyl methacrylate, 45 parts of butanediolacrylateacetylacetate and 5 parts of acrylic acid, 70% dissolved in ethylglycol, is neutralized with 2.8 parts of concentrated aqueous ammonia and diluted with water until the flow time measured according to 4 DIN 53 211 is 19 seconds.

140 parts of this dilute solution are placed in one of the supply chambers of a two-component spray gun. In the other supply chamber there are placed 11.5 parts of a 37% aqueous formaldehyde solution. The two solutions are sprayed simultaneously onto a primed piece of leather. The resulting coating is nontacky immediately after application and is completely insoluble in water and organic solvents. The adhesion is 1,000 g./cm.$^2$ after application and 4,000 g./cm.$^2$ 4 hours later.

EXAMPLE 3

52 parts of an 80% solution of a copolymer of 20 parts ethyleneglycolacrylatecyanoacetate, 70 parts of ethyl acrylate and 10 parts of acrylic acid in ethanol are neutralized with 3 parts of N,N-dimethyl ethanolamine and then diluted with 140 parts of water to spraying consistency (flow time about 20 seconds as measured by 4 DIN 52 211).

This solution is sprayed on to primed leather together with 11.5 parts of a 37% aqueous formaldehyde solution by means of a two-component spray gun. The resulting coating is immediately stackable and resistant to solvents and aging. Cold rupturing begins below −8° C.

EXAMPLE 4

The following solutions are simultaneously sprayed onto buffed box cowhide from a two-component spray gun in a single operation: 10 parts of a 10% solution of a copolymer comprising 45 parts of ethyleneglycolmonoacrylateacetylacetate, 50 parts of methyl methacrylate and 5 parts of acrylic acid; 1 part of a 30% solution of formaldehyde in n-butanol.

The resulting coating is absolutely dry and firm to the touch after 2 minutes. After 4 hours the adhesion is 4,000 g./cm.². Crease resistance: no permanent changes apparent after 50,000 creasings in both directions with a Bally flexometer.

Resistance to cold rupturing lasts down to −5° C. The fastness to hot ironing is good.

Abrasion fastness: no abrasion visible on the surface after 5,000 revolutions on a Satra apparatus under a load of 2.5 kg.

EXAMPLE 5

In a round-bottomed flask 180 parts of butanediolacrylateacetylacetate, 20 parts of methyl methacrylate and 2 parts of azodiisobutyronitrile are dissolved. The air is displaced by nitrogen and then the solution is stirred slowly and heated to 70° C. and maintained at this temperature. Polymerization begins after about 10 minutes. The exothermic reaction is controlled by cooling, the temperature being maintained at 70° C. The polymerization time is 12 hours. On cooling, the polymer separates from the solvent, which is finally removed by decantation.

The polymer may be reprecipitated from acetone by the addition of ether, and thus purified. A twice precipitated product (dried at 0.2 torr and 50° C.) has a K-value of 30 (as measured in a 1% w./w. solution in dimethylformamide).

30 parts of the crude copolymer are dissolved in 100 parts of n-butyl acetate, and 0.5 part of 100% acetic acid and 8 parts of a 7% solution of hexamethylene tetramine in chloroform are added, and the mixture is stirred thoroughly.

The resulting solution is sprayed onto a primed piece of leather with a spray gun. The leather is air-dried. After 24 hours a solvent-resistant, waterproof coating is obtained which is non-rupturable down to −10° C.

EXAMPLE 6

10 parts of poly(vinylethylether) are dissolved in 165 parts of petroleum ether (B.P 120–160° C.). To this solution there are added 30 parts of ethyl acrylate, 26 parts of methyl methacrylate, 20 parts of butanediolacrylateacetylacetate, 12 parts of N-butoxymethyl methacrylamide, 10 parts of butanediol monoacrylate, 2 parts of acrylic acid and 1 part of azodiisobutyronitrile. The air is displaced by nitrogen. The mixture is then heated to 30° C. and stirred for 6 hours at that temperature. After cooling, there is obtained a stable, low-viscosity dispersion of a copolymer which contains acetylacetate groups.

This dispersion is sprayed without further dilution on to primed leather with spray gun using formaldehyde gas containing compressed air (obtained by passing the compressed air over a concentrated aqueous formaldehyde solution). The resulting finish is resistant to water and solvents.

We claim:

1. A process for dressing natural leather which comprises applying to said leather a coating of a composition comprising:
(I) a copolymer composed of
(a) 0.5 to 90% by weight based on the total weight of monomer, of copolymerizable ethylenically unsaturated compounds carrying acetyl acetate groups or cyano acetate groups, and
(b) 99.5 to 10% by weight of other copolymerizable ethylenically unsaturated compounds in the form of a solution in an organic liquid or a dispersion in an organic liquid or water, and
(II) an aldehyde, a mixture of different aldehydes or compounds capable of dissociating to form an aldehyde, the molar ratio of acetyl acetate groups and cyano acetate groups in (I) to the carbonyl group in the aldehyde being 5:1 to 2:1, as cross-linking agent, and thereafter drying the coated leather.

2. A process as in claim 1 wherein the copolymer (I) is composed of
(a) copolymerizable ethylenically unsaturated compounds of the formula

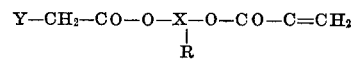

where X stands for an alkylene radical of 2 to 10 carbon atoms or an oxalkylene radical of 4 to 10 carbon atoms, R stands for hydrogen or methyl group and Y stands for an acetyl or cyano group, and
(b) at least one of the copolymerizable ethylenically unsaturated compounds selected from the group consisting of acrylic acid, methacrylic acid, alkyl acrylates and methacrylates containing 1 to 8 carbon atoms in the alkyl radical, vinyl esters of acetic acid, propionic acid and versatic acids, N-hydroxymethylamides of acrylic acid, methacrylic acid or mixtures thereof and their ethers containing 1 to 8 carbon atoms in the alkyl radical, acrylonitrile, methacrylonitrile, allyl alcohol, methallyl alcohol, vinyl chloride, vinylidene chloride and butadiene, in the form of a solution or dispersion in hydrocarbons with a boiling range of 80 to 160° C., toluene, xylene, ethyl acetate, isobutanol, n-butanol, acetates of glycol monomethyl ether and glycol monoethyl ether, acetone, methylethyl ketone, ethanol, n-propanol, isopropanol, glycol monoethyl ether or glycol monoethyl ether,
and wherein the aldehyde (II) is at least one aldehyde selected from the group consisting of formaldehyde, acetaldehyde, propionaldehyde, glyoxal, acrolein and methacroyein and the aldehyde-forming compound (II) is dimethylol urea or hexamethylene tetramine.

3. A process as in claim 2 wherein the copolymer (I) is composed of 10 to 90% by weight, based on the total weight of monomer, of monomers (a) and 90 to 10% by weight of monomers (b).

4. A process as in claim 2 wherein the copolymer (I) is composed of 10 to 90% by weight, based on the total weight of monomer, of monomers (a) and 90 to 10% by weight of at least one of the copolymerizable ethylenically unsaturated compounds selected from the group consisting of acrylic acid, methacrylic acid, alkyl acrylates and methacrylates containing 1 to 8 carbon atoms in the alkyl radical, N-hydroxymethylamides of acrylic and methacrylic acids and their ethers containing 1 to 8 carbon atoms in the alkyl radical.

5. A process as in claim 1 wherein the copolymers (I) and the aldehyde or aldehyde-forming compound (II) are applied to the leather by means of a two-component spray gun.

6. A process as in claim 1 wherein the copolymers (I) and the aldehyde or aldehyde-forming compound (II) are applied to the leather by means of a two-component casting machine.

7. A process as in claim 1 wherein the composition of components (I) and (II) is produced during application.

8. A process as in claim 1 wherein additionally basic materials are used as catalysts.

9. A process as in claim 8 wherein the basic materials used as catalysts are selected from the group consisting of pyridine, trimethylamine, triethylamine, N-dialkyl ethanolamine containing 1 to 8 carbon atoms in the alkyl radical and sodium methylate.

10. A process as in claim 1 wherein acid materials are used as catalysts.

11. A process as in claim 1 wherein the coating is dried at temperatures ranging from room temperature to 80° C.

12. Dressed natural leather coated with a copolymer consisting essentially of (a) 0.5 to 90% by weight, based on the total weight of monomer of copolymerizable ethylenically unsaturated compounds of the formula $$Y-CH_2-CO-O-X-O-CO-\underset{R}{C}=CH_2$$

where X stands for an alkylene radical of 2 to 10 carbon atoms or an oxalkylene radical of 4 to 10 carbon atoms, R stands for hydrogen or a methyl group and Y stands for an acetyl or cyano group, and (b) 99.5 to 10% by weight of at least one of the copolymerizable ethylenically unsaturated compounds selected from the group consisting of acrylic acid, methacrylic acid, alkyl acrylates and methacrylates containing 1 to 8 carbon atoms in the alkyl radical, vinyl esters of acetic acid, propionic acid and versatic acids, N-hydroxymethylamides of acrylic acid, methacrylic acid and mixtures thereof and their ethers containing 1 to 8 carbon atoms in the alkyl radical, acrylonitrile, methacrylonitrile, allyl alcohol, methallyl alcohol, vinyl chloride, vinylidene chloride and butadiene, (a) and (b) being cross-linked with at least one aldehyde selected from the group consisting of formaldehyde, acetaldehyde, propionaldehyde, glyoxal, acrolein and methacrolein; or with dimethylol urea or hexamethylene tetramine; the molar ratio of acetyl acetate groups and cyano acetate groups in said copolymer to the carbonyl group in the aldehyde being 5:1 to 2:1.

References Cited

UNITED STATES PATENTS 3,307,967  3/1967  Seifer et al. _____ 117—142 X
3,321,420  3/1967  Unger _____ 117—142 X WILLIAM D. MARTIN, Primary Examiner R. HUSACK, Assistant Examiner U.S. Cl. X.R.

117—105.5, 161 UT, L, DIG 3; 260—73 R, 80.8

PO-1050
(5/69)

UNITED STATES PATENT OFFICE
CERTIFICATE OF CORRECTION

Patent No. 3,677,813            Dated July 18, 1972

Inventor(s) Guenter Eckert et al

It is certified that error appears in the above-identified patent and that said Letters Patent are hereby corrected as shown below:

Column 6, line 9, "Y-CH$_2$-O-X-O-CO-C$\doteq$CH$_2$"
$\quad\quad\quad\quad\quad\quad\quad\quad\quad\quad\quad\quad\quad\quad$ |
$\quad\quad\quad\quad\quad\quad\quad\quad\quad\quad\quad\quad\quad\quad$ R should read -- Y-CH$_2$-O-X-O-CO-C=CH$_2$ --.
$\quad\quad\quad\quad\quad\quad\quad\quad\quad\quad\quad\quad\quad\quad\quad\quad$ |
$\quad\quad\quad\quad\quad\quad\quad\quad\quad\quad\quad\quad\quad\quad\quad\quad$ R Column 6, lines 34 to 35, "glycol monoethyl ether or glycol monoethyl ether" should read -- glycol monomethyl ether or glycol monoethyl ether --.

Column 6, line 39, "methacroyein" should read -- methacrolein --.

Signed and sealed this 9th day of January 1973.

(SEAL)
Attest:

EDWARD M.FLETCHER,JR.            ROBERT GOTTSCHALK
Attesting Officer                     Commissioner of Patents